US011019041B2

(12) United States Patent
Zhu et al.

(10) Patent No.: US 11,019,041 B2
(45) Date of Patent: May 25, 2021

(54) NETWORK MONITORING APPARATUS, AND REMOTE ENCRYPTION AND REMOTE ACTIVATION METHOD, DEVICE AND SYSTEM THEREOF

(71) Applicant: HANGZHOU HIKVISION DIGITAL TECHNOLOGY CO., LTD., Zhejiang (CN)

(72) Inventors: Zhenlei Zhu, Zhejiang (CN); Yadong Pan, Zhejiang (CN); Kui Li, Zhejiang (CN); Lujie Si, Zhejiang (CN); Xiaoyuan Zhang, Zhejiang (CN)

(73) Assignee: HANGZHOU HIKVISION DIGITAL TECHNOLOGY CO., LTD.

( * ) Notice: Subject to any disclaimer, the term of this patent is extended or adjusted under 35 U.S.C. 154(b) by 41 days.

(21) Appl. No.: 15/735,340

(22) PCT Filed: Nov. 24, 2015

(86) PCT No.: PCT/CN2015/095447
§ 371 (c)(1),
(2) Date: Dec. 11, 2017

(87) PCT Pub. No.: WO2016/197555
PCT Pub. Date: Dec. 15, 2016

(65) Prior Publication Data
US 2018/0176188 A1 Jun. 21, 2018

(30) Foreign Application Priority Data
Jun. 11, 2015 (CN) .......................... 201510320504.6

(51) Int. Cl.
*G06F 21/00* (2013.01)
*H04L 29/06* (2006.01)
(Continued)

(52) U.S. Cl.
CPC ............ *H04L 63/045* (2013.01); *G06F 21/31* (2013.01); *G06F 21/34* (2013.01); *G06F 21/45* (2013.01);
(Continued)

(58) Field of Classification Search
CPC ....... H04L 63/045; H04L 9/0869; H04L 9/30; H04L 9/3271; H04L 63/083; G06F 21/31; G06F 21/34; G06F 21/46
See application file for complete search history.

(56) References Cited

U.S. PATENT DOCUMENTS 6,175,926 B1 * 1/2001 Fogle ...................... G06F 21/31
726/19
7,443,983 B2 * 10/2008 Tanizawa ............ H04L 63/0428
380/270
(Continued)

FOREIGN PATENT DOCUMENTS

| CN | 1885226 A | 12/2006 |
|---|---|---|
| CN | 101051904 A | 10/2007 |

(Continued)

OTHER PUBLICATIONS

PCT International Search Report dated Mar. 11, 2016 for PCT Patent Application No. PCT/CN2015/095447.
(Continued)

*Primary Examiner* — Jeffrey C Pwu
*Assistant Examiner* — Rodman Alexander Mahmoudi
(74) *Attorney, Agent, or Firm* — Norton Rose Fulbright US LLP

(57) ABSTRACT

A network monitoring apparatus, and a remote encryption and remote activation method, device and system thereof are provided. The method includes the following steps: receiving an encrypted activation password sent by a client terminal; decrypting the encrypted activation password to
(Continued)

obtain an original activation password; determining whether the original activation password meets a predetermined password strength requirement; when the original activation password meets the predetermined password strength requirement, activating the network monitoring apparatus and setting the original activation password as an administrator password; and returning information indicating that the network monitoring apparatus is successfully activated to the client terminal. A network monitoring apparatus, an encryption method of a network monitoring apparatus based on a client terminal, a client terminal, and a remote activation system based on a network monitoring apparatus are also provided.

16 Claims, 5 Drawing Sheets

(51) Int. Cl.

| | | |
|---|---|---|
| *G06F 21/34* | (2013.01) | |
| *G06F 21/45* | (2013.01) | |
| *G06F 21/31* | (2013.01) | |
| *H04L 9/32* | (2006.01) | |
| *G06F 21/46* | (2013.01) | |
| *H04L 9/08* | (2006.01) | |
| *H04L 9/30* | (2006.01) | |

(52) U.S. Cl.
CPC ............ *G06F 21/46* (2013.01); *H04L 9/0869* (2013.01); *H04L 9/30* (2013.01); *H04L 9/3226* (2013.01); *H04L 9/3249* (2013.01); *H04L 9/3271* (2013.01); *H04L 63/083* (2013.01)

(56) References Cited

U.S. PATENT DOCUMENTS

| | | | |
|---|---|---|---|
| 9,590,978 B2 * | 3/2017 | Joyce, III | .............. H04L 63/083 |
| 2004/0073815 A1 | 4/2004 | Sanai et al. | |
| 2006/0123133 A1 * | 6/2006 | Hrastar | ................. H04W 24/00 |
| | | | 709/238 |
| 2007/0257768 A1 | 11/2007 | Bowers et al. | |
| 2008/0178281 A1 | 7/2008 | Narayanaswami et al. | |
| 2008/0222127 A1 * | 9/2008 | Bergin | ................ G06F 16/9017 |
| 2014/0164777 A1 * | 6/2014 | Wielopolski | .............. H04L 9/12 |
| | | | 713/171 |
| 2015/0067760 A1 | 3/2015 | Waltermann et al. | |
| 2015/0074414 A1 | 3/2015 | Kim | |
| 2016/0005032 A1 * | 1/2016 | Yau | .................... G06Q 20/3278 |
| | | | 705/69 |

FOREIGN PATENT DOCUMENTS

| | | |
|---|---|---|
| CN | 101453325 A | 6/2009 |
| CN | 101980508 A | 2/2011 |
| CN | 102254380 A | 11/2011 |
| CN | 103595718 A | 2/2014 |
| CN | 104135726 A | 11/2014 |
| CN | 104168567 A | 11/2014 |
| CN | 104410641 A | 3/2015 |
| EP | 1850261 A1 | 10/2007 |

OTHER PUBLICATIONS

Extended European search report for European Application No. 15894810.9, dated Oct. 16, 2018.
Menezes, A.; Van Oorschot, P.; and Vanstone, S., "Chapter 10: Identification and Entity Authentication" Handbook of Applied Cryptography; [CRC Press Series on Discrete Mathematices and Its Applications], 1997 CRC Press, Boca Raton, FL, US, pp. 385-424.
"Descriptions about Device Newly-Added Activation Mechanism for Hikvision." *Hikvision*, https://www.hikvision.com/cn/support_det_45_1249.html. Accessed Jul. 14, 2020 (English Translation provided).
*Descriptions of Hikvision NVR Activation Mechanism (Apr. 20, 2015)*. Hikvision, https://wenku.baidu.com/view/a927074da1c7aa00b52acbde.html_Rec_flag=default May 19, 2015. (English Translation provided).
*Introduction of Network Camera IE Activation Function (2015)*. Hikvision, https://wenku.baidu.com/view/bec3c6a9c1c708a1294a4426.html Apr. 26, 2015. (English translation provided).
Office Action issued in Corresponding Chinese Application No. 201510320504.6, dated Jun. 8, 2020 (English Translation provided).
Office Action issued in Corresponding European Application No. 15894810.9, dated Apr. 29, 2020.

* cited by examiner

NETWORK MONITORING APPARATUS, AND REMOTE ENCRYPTION AND REMOTE ACTIVATION METHOD, DEVICE AND SYSTEM THEREOF

CROSS-REFERENCE TO RELATED APPLICATIONS/INCORPORATION BY REFERENCE

This application is a 371 of International Patent Application No. PCT/CN2015/095447, filed Nov. 24, 2015, entitled "Network Monitoring Apparatus, and Remote Encryption and Remote Activation Method, Device and System Therefor," which claims priority to Chinese patent application No. 201510320504.6, filed Jun. 11, 2015, entitled "Remote Activation Method, Device and Remote Activation System of Network Monitoring Equipment". The above-identified applications are hereby incorporated herein by reference in their entirety.

TECHNICAL FIELD

The present disclosure relates to the technical field of network security, and in particular to a network monitoring apparatus, and a remote encryption and remote activation method, device and system thereof.

BACKGROUND

At present, in a security monitoring industry, factory settings of a network monitoring apparatus have the following problems.

The factory settings of the network monitoring apparatus have a default username and default password (e.g., a default administrator username: admin, and a default administrator password: 12345). A current general method for a situation of a default username and a default password is to remind a user that the user should change the default password when the user logins in. However, this reminder may be ignored by the user. Actually, few users will choose to change default passwords. Under this situation, the network monitoring apparatus adopting the default password, particularly when being connected to a World Wide Web, is more likely to be illegally controlled.

SUMMARY

At least some embodiments of the present disclosure provide a network monitoring apparatus, and a remote encryption and remote activation method, device and system thereof.

In one embodiment of the present disclosure, a remote activation method of a network monitoring apparatus is provided. The method includes: receiving an encrypted activation password sent by a client terminal; decrypting the encrypted activation password to obtain an original activation password; determining whether the original activation password meets a predetermined password strength requirement; when the original activation password meets the predetermined password strength requirement, activating the network monitoring apparatus and setting the original activation password as an administrator password; and returning information indicating that the network monitoring apparatus is successfully activated to the client terminal.

In an exemplary embodiment, receiving the encrypted activation password sent by the client terminal includes: receiving a public key sent by the client terminal and generated via a first algorithm, encrypting a original random string generated by the network monitoring apparatus via the public key to generate an encrypted random string, returning the encrypted random string to the client terminal; and receiving an activation password sent by the client terminal and encrypted via a second algorithm, and the activation password is generated by encrypting an original activation password via the second algorithm, and a key of the second algorithm is the original random string.

In an exemplary embodiment, decrypting the encrypted activation password to obtain the original activation password includes: decrypting the activation password via a second algorithm to obtain the original activation password.

In an exemplary embodiment, before receiving the public key sent by the client terminal and generated via the first algorithm, further including: reporting a Media Access Control (MAC) address to the client terminal, and the MAC address is used for uniquely identifying an identity of the network monitoring apparatus.

In an exemplary embodiment, receiving the public key sent by the client terminal and generated via the first algorithm includes: receiving a public key matched with an MAC address of the network monitoring apparatus, sent by the client terminal and generated via the first algorithm.

In an exemplary embodiment, returning the encrypted random string to the client terminal further includes: reporting an MAC address to the client terminal, and the MAC address is used for uniquely identifying an identity of the network monitoring apparatus.

In an exemplary embodiment, receiving the activation password sent by the client terminal and encrypted via the second algorithm includes: receiving an activation password matched with an MAC address of the network monitoring apparatus, sent by the client terminal and encrypted via the second algorithm.

In an exemplary embodiment, the first algorithm is a RSA asymmetric encryption algorithm.

In an exemplary embodiment, the second algorithm is an Advanced Encryption Standard (AES) symmetric encryption algorithm.

In the remote activation method of the network monitoring apparatus provided in at least some embodiments of the present disclosure, a default password is not set for the network monitoring apparatus, and the network monitoring apparatus cannot be used before being activated, that is, the network monitoring apparatus is able to be used after being activated by a user, so that an old bad habit of always using the default password by the user is changed. Moreover, an original activation password input by the user is subjected to strength check, and a too simple password is not allowed to be used for activating the network monitoring apparatus, such that an illegal user cannot remotely control the monitoring apparatus by using the default password or guessing a current password that is too simple, thereby improving password security. Besides, at least one embodiment of the present disclosure combines a RSA asymmetric encryption algorithm and an AES symmetric encryption algorithm in a process of encrypting an original activation password input by a user, and it is difficult to crack the activation password input by the user from a network, thereby further enhancing a security of an activation process.

In another embodiment of the present disclosure, a network, monitoring apparatus is provided. The network monitoring apparatus includes: an interface, arranged to receive an encrypted activation password sent by a client terminal; an encryption and decryption element, arranged to decrypt the encrypted activation password to obtain an original activation password; a determination element, arranged to determine whether the original activation password meets a predetermined password strength requirement; an activation element, arranged to activate, when the original activation password meets the predetermined password strength requirement, the network monitoring apparatus and set the original activation password as an administrator password; and the interface, further arranged to return information indicating that the network monitoring apparatus is successfully activated to the client terminal.

In an exemplary embodiment, the interface is arranged to receive a public key sent by the client terminal and generated via a first algorithm, and return an encrypted random string to the client terminal, and the encrypted random string is obtained by encrypting, by the encryption and decryption element, a original random string generated by the network monitoring apparatus via the public key; and, the interface is further arranged to receive an activation password sent by the client terminal and encrypted via a second algorithm, and the activation password is generated by encrypting, by the client terminal, the original activation password via the second algorithm, and a key of the second algorithm is the original random string.

In an exemplary embodiment, the encryption and decryption element is arranged to decrypt the encrypted activation password via a second algorithm to obtain the original activation password.

In an exemplary embodiment, the interface is further arranged to, before receiving the public key sent by the client terminal and generated via the first algorithm, report a Media Access Control (MAC) address to the client terminal, and the MAC address is used for uniquely identifying an identity of the network monitoring apparatus.

In an exemplary embodiment, the interface is arranged to receive a public key sent by the client terminal and generated via the first algorithm includes the following step: receiving a public key matched with an MAC address of the network monitoring apparatus, sent by the client terminal and generated via the first algorithm.

In an exemplary embodiment, the interface is further arranged to, besides returning the encrypted random string to the client terminal, report an MAC address to the client terminal, and the MAC address is used for uniquely identifying an identity of the network monitoring apparatus.

In an exemplary embodiment, the interface is arranged to receive the activation password sent by the client terminal and encrypted via the second algorithm includes the following step: receiving an activation password matched with an MAC address of the network monitoring apparatus, sent by the client terminal and encrypted via the second algorithm.

In an exemplary embodiment, the first algorithm is a RSA asymmetric encryption algorithm.

In an exemplary embodiment, the second algorithm is an Advanced Encryption Standard (AES) symmetric encryption algorithm.

In the network monitoring apparatus provided in at least some embodiments of the present disclosure, a default password is not set for the network monitoring apparatus, and the device cannot be used before being activated, that is, the network monitoring apparatus is able to be used after being activated by a user, so that an old bad habit of always using the default password by the user is changed. Moreover, an original activation password input by the user is subjected to strength check, and a too simple password is not allowed to be used for activating the device, such that an illegal user cannot remotely control the monitoring by using the default password or guessing a current password that is too simple, thereby improving password security. Besides, the present disclosure combines a RSA asymmetric encryption algorithm and an AES symmetric encryption algorithm in a process of encrypting original activation password input by a user, and it is difficult to crack the activation password input by the user from a network, thereby further enhancing a security of an activation In another embodiment of the present disclosure, an encryption method of a network monitoring apparatus based on a client terminal is provided. The method includes: receiving an original activation password of a network monitoring apparatus; encrypting the original activation password; sending an encrypted activation password to the network monitoring apparatus; and after the network monitoring apparatus is activated successfully according to the encrypted activation password, receiving information, indicating that the network monitoring apparatus is successfully activated, returned from the network monitoring apparatus.

In an exemplary embodiment, sending the encrypted activation password to the network monitoring apparatus includes: generating a public key and a private key via a first algorithm, sending the public key to the network monitoring apparatus, and the public key is adopted by the network monitoring apparatus to encrypt the original random string generated by the network monitoring apparatus to generate an encrypted random string; receiving the encrypted random string sent by the network monitoring apparatus, decrypting the encrypted random string via the private key to obtain the original random string, and setting the original random string as a key of a second algorithm; and encrypting the original activation password via the second algorithm to obtain the encrypted activation password.

In an exemplary embodiment, before sending the public key to the network monitoring apparatus, the method further includes: receiving a Media Access Control (MAC) address sent by the network monitoring apparatus, and the MAC address is used for uniquely identifying an identity of the network monitoring apparatus.

In an exemplary embodiment, sending the public key to the network monitoring apparatus includes: sending a public key matched with an MAC address of the network monitoring apparatus to the network monitoring apparatus.

In an exemplary embodiment, receiving the encrypted random string sent by the network monitoring apparatus further includes: receiving an MAC address sent by the monitoring apparatus, and the MAC address is used for uniquely identifying an identity of the network monitoring apparatus.

In an exemplary embodiment, sending the encrypted activation password to the network monitoring apparatus includes: sending an activation password matched with an MAC address of the network monitoring apparatus to the network monitoring apparatus.

In an exemplary embodiment, the first algorithm is a RSA asymmetric encryption algorithm, and the second algorithm is an Advanced Encryption Standard (AES) symmetric encryption algorithm.

In the encryption method of the network monitoring apparatus based on the client terminal provided in at least some embodiments of the present disclosure, a default password is not set for the network monitoring apparatus, and the network monitoring apparatus cannot be used before being activated, that is, the network monitoring apparatus is able to be used after being activated by a user, so that an old bad habit of always using the default password by the user is changed. Moreover, an original activation password input by the user is subjected to strength check, and a too simple password is not allowed to be used for activating the device, such that an illegal user cannot remotely control the monitoring apparatus by using the default password or guessing a current password that is too simple, thereby improving password security. Besides, the present disclosure combines a RSA asymmetric encryption algorithm and an AES symmetric encryption algorithm in a process of encrypting an original activation password input by a user, and it is difficult to crack the activation password input by the user from a network, thereby further enhancing a security of an activation process.

In another embodiment of the present disclosure, a client terminal is provided. The client terminal includes: an interface, arranged to receive an original activation password of a network monitoring apparatus; an encryption and decryption element, arranged to encrypt the original activation password; and the interface, further arranged to send an encrypted activation password to the network monitoring apparatus, and receive, after the network monitoring apparatus is activated successfully according to the encrypted activation password, information, indicating that the network monitoring apparatus is successfully activated, returned from the network monitoring apparatus.

In an exemplary embodiment, the encryption and decryption element is arranged to generate a public key and a private key via a first algorithm, and send the public key to the network monitoring apparatus via the interface, and the public key is adopted by the network monitoring apparatus to encrypt the original random string generated by the network monitoring apparatus to generate an encrypted random string; the interface is arranged to receive the encrypted random string sent by the network monitoring apparatus, decrypt the encrypted random string via the private key to obtain the original random string, and set the obtained original random string as a key of a second algorithm; and the encryption and decryption element is arranged to encrypt the original activation password via the second algorithm to obtain the encrypted activation password.

In an exemplary embodiment, the interface is further arranged to, before sending the public key to the network monitoring apparatus, receive a Media, Access Control (MAC) address sent by the network monitoring apparatus, and the MAC address is used for uniquely identifying an identity of the network monitoring apparatus.

In an exemplary embodiment, the interface is arranged to send the public key to the network monitoring apparatus includes the following step: sending a public key matched with an MAC address of the network monitoring apparatus to the network monitoring apparatus.

In an exemplary embodiment, the interface is arranged to receive the encrypted random string sent by the network monitoring apparatus further includes the following step: receiving an MAC address sent by the network monitoring apparatus, and the MAC address is used for uniquely identifying an identity of the network monitoring apparatus.

In an exemplary embodiment, the interface is arranged to send the encrypted activation password to the network monitoring apparatus includes the following step: sending an activation password matched with an MAC address of the network monitoring apparatus to the network monitoring apparatus.

In an exemplary embodiment, the first algorithm is a RSA asymmetric encryption algorithm, and the second algorithm is an Advanced Encryption Standard (AES) symmetric encryption algorithm.

In the client terminal provided in at least some embodiments of the present disclosure, default password is not set for the network monitoring apparatus, and the network monitoring apparatus cannot be used before being activated, that is, the network monitoring apparatus is able to be used after being activated by a user, so that an old bad habit of always using the default password by the user is changed. Moreover, an original activation password input by the user is subjected to strength check, and a too simple password is not allowed to be used activating the device, such that an illegal user cannot remotely control the monitoring by using the default password or guessing a current password that is too simple, thereby improving password security. Besides, the present disclosure combines a RSA asymmetric encryption algorithm and an AES symmetric encryption algorithm in a process of encrypting original activation password input by a user, and it is difficult to crack the activation password input by the user from a network, thereby further enhancing a security of an activation In another embodiment of the present disclosure, a remote activation system based on a network monitoring apparatus is provided. The system includes: a client terminal, arranged to receive an original activation password of a network monitoring apparatus, and encrypt the original activation password; and the network monitoring apparatus, arranged to receive an encrypted activation password from the client terminal, decrypt the encrypted activation password to obtain the original activation password, determine whether the original activation password meets a predetermined password strength requirement, activate, when the original activation password meets the predetermined password strength requirement, the network monitoring apparatus and set the original activation password as an administrator password, and return information indicating that the network monitoring apparatus is successfully activated to the client terminal; the client terminal, further arranged to send, after receiving the information indicating that the network monitoring apparatus is successfully activated, a prompt indicating that the network monitoring apparatus is successfully activated.

In an exemplary embodiment, the client terminal is arranged to receive the original activation password of a network monitoring apparatus and encrypt the original activation password includes the following step: sending a public key generated via a first algorithm to the network monitoring apparatus, and the public key is adopted by the network monitoring apparatus to encrypt the original random string generated by the network monitoring apparatus to generate an encrypted random string; and decrypting the encrypted random string returned by the network monitoring apparatus by using a private key generated via the first algorithm to obtain the original random string, setting the original random string as a key of a second algorithm, encrypting the original activation password via the second algorithm to obtain an encrypted activation password, and sending the encrypted activation password to the network monitoring apparatus.

In the remote activation system based on the network monitoring apparatus provided at least some embodiments of the present disclosure, a default password is not set for the network monitoring apparatus, and the network monitoring apparatus cannot be used before being activated, that is, the network monitoring apparatus is able to be used after being activated by a user, so that an old bad habit of always using the default password by the user changed. Moreover, an original activation password input by the user is subjected to strength check, and a too simple password is not allowed to be used for activating the device, such that an illegal user cannot remotely control the monitoring apparatus by using the default or guessing a current password that is too simple, thereby improving password security. Besides, the present disclosure combines a RSA asymmetric encryption algorithm and a symmetric encryption AES algorithm in a process of encrypting an original activation input by a user, and it is difficult to crack the activation password input by the user from a network, thereby further enhancing a security of an activation process.

BRIEF DESCRIPTION OF THE DRAWINGS

In order to more clearly illustrate the technical solutions in the embodiments of the present disclosure or the related art, drawings needing to be used in the embodiments will be simply introduced. Obviously, the drawings described below are only some embodiments of the present disclosure. On the premise of no creative work, a person of ordinary skill in the art may also obtain other drawings according to these drawings. As shown in the drawings, the above-mentioned and other purposes, features and advantages of the present disclosure will be clearer. The same drawing mark in all the drawings indicates the same part. The drawings are not drawn by equal scaling according to actual sizes on purpose. Showing of the substance of the present disclosure is focused.

DETAILED DESCRIPTION

Figure 1:
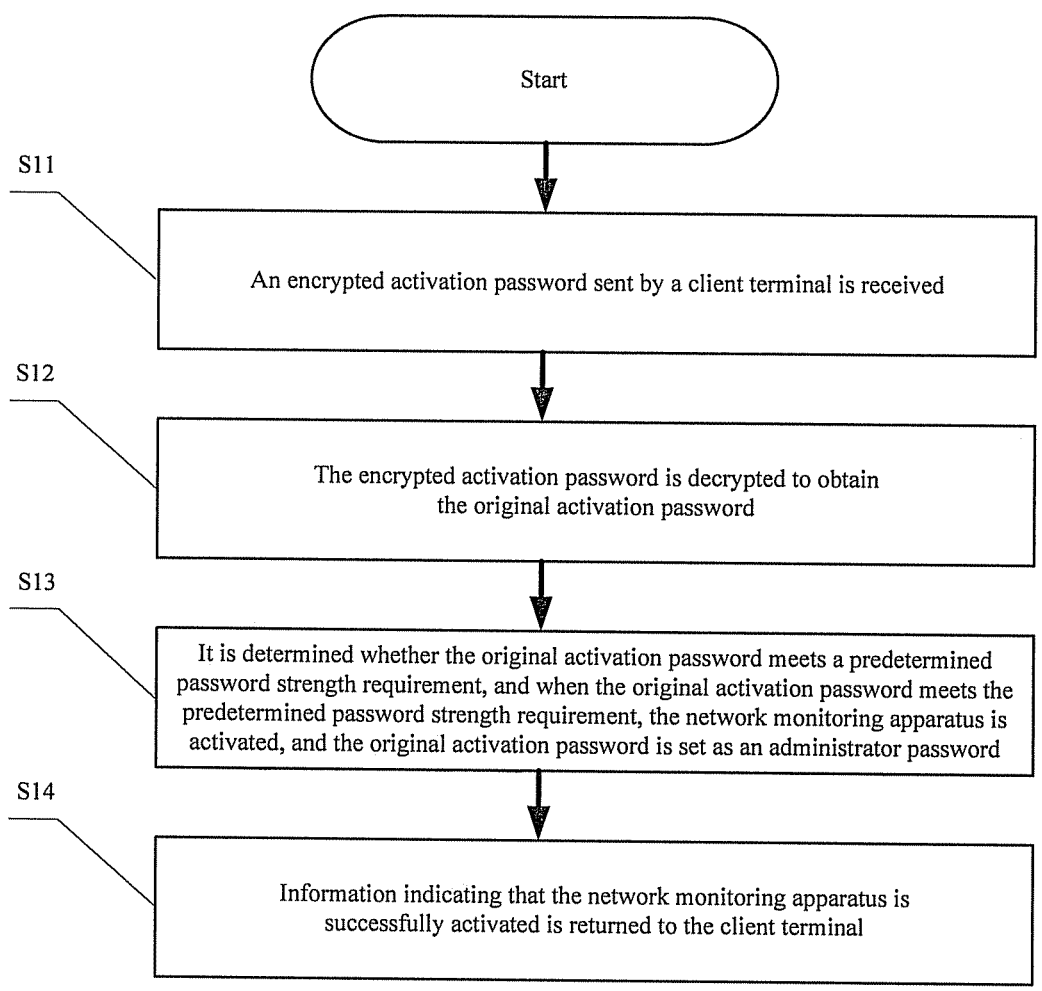
FIG. 1 is a flowchart of a remote activation method of a network monitoring apparatus according to an exemplary embodiment of the present disclosure.

In order to make a person skilled in the art better understand solutions of the present disclosure, technical solutions in embodiments of the present disclosure will be clearly and completely described herein below with reference to drawings in the embodiments of the present disclosure. Obviously, the described embodiments are a part of the embodiments of the present disclosure, not all of the embodiments. On a basis of the embodiments of the present disclosure, all other embodiments obtained on the premise of no creative work of a person of ordinary skill in the art fall within the scope of protection of the present disclosure.

It is important to note that the description and claims of the present disclosure and terms "first", "second" and the like in the drawings are intended to distinguish similar objects, and do not need to describe a specific sequence or a precedence order. It should be understood that data used in such a way can be exchanged under appropriate conditions, in order that the embodiments of the present disclosure described here can be implemented in a sequence except sequences graphically shown or described here. In addition, terms "include" and "have" and any inflexions of the terms are intended to cover non-exclusive inclusions. For example, processes, methods, systems, products or devices containing a series of steps or elements do not need to clearly list those steps or elements, and may include other inherent steps or elements of these processes, methods, products or devices, which are not clearly listed.

To solve problems in the related art, a network monitoring apparatus, and a remote encryption and remote activation method, device and system of the network monitoring apparatus are provided in the present disclosure. By re-encrypting an original activation password input by a user, it is difficult to crack the original activation password on a network, thereby enhancing a security of an activation process. Herein, the network monitoring apparatus refers to a security monitoring apparatus which is provided with a network component and is accessed via an IP address, such as a Digital Video Recorder (DVR), a Digital Video Server (DVS), a Network Video Recorder (NVR), a Central Video Recorder (CVR), an IP Camera (IPC), and a transmission and display device.

FIG. 1 is a flowchart of a remote activation method of a network monitoring apparatus according to an exemplary embodiment of the present disclosure. It is important to note that an executed object of the remote activation method of the network monitoring apparatus is the network monitoring apparatus. That is, the network monitoring apparatus completes the steps as follows.

At step S11, an encrypted activation password sent by a client terminal is received.

After booting, the user accesses the network monitoring apparatus via the client terminal. Since the network monitoring apparatus is not activated yet at this time, a non-activated device cannot execute any other operations such as modification of an IP address. When the network monitoring apparatus is activated completely, network operations can be realized.

The network monitoring apparatus informs the client terminal that the network monitoring apparatus can be used after the network monitoring apparatus is activated. And after the user inputs an original activation password, the client terminal encrypts the original activation password and then sends an encrypted activation password to the network monitoring apparatus.

At step S12, the encrypted activation password is decrypted to obtain the original activation password.

The network monitoring apparatus decrypts the encrypted activation password received at step S11, so as to obtain the original activation password input by the user.

At step S13, it is determined whether the original activation password meets a predetermined password strength requirement, and when the original activation password meets the predetermined password strength requirement, the network monitoring apparatus is activated, and the original activation password is set as an administrator password.

The network monitoring apparatus analyzes a complexity of the decrypted original activation password, i.e., checks whether the complexity (namely password strength) of a password set by the user meets the predetermined password strength requirement. For example, the predetermined password strength requirement satisfies the following conditions: combination of numbers, capital letters and lowercase letters, and a password length is at least bits. At this time, when an original activation password input by the user is U0123CRRT, a password is determined to be unqualified due to the fact that the password does not have a lowercase letter and a password length does not reach 8 bits.

When the original activation password meets the predetermined password strength requirement, the network monitoring apparatus is activated. And the original activation password is set as an administrator password of the network monitoring apparatus. When the original activation password does not meet the predetermined password strength requirement, the network monitoring apparatus returns information to the client terminal, and this information is used for indicating that the network monitoring apparatus is not successfully activated.

At step S14, information indicating that the network monitoring apparatus is successfully activated is returned to the client terminal.

After being activated successfully, the network monitoring apparatus sends information indicating that the network monitoring apparatus is successfully activated to the client terminal. The client terminal reminds the user that the network monitoring apparatus is successfully activated. And then the user logs in the network monitoring apparatus as an administrator by using the set original activation password, and performs other network operations.

It is important to note that the remote activation method of the network monitoring apparatus of the present disclosure includes: an activation mode based on an IP address and an activation mode based on an MAC address according to different network interaction modes. The difference between the two activation modes lies in network interaction, and encryption modes of the two activation modes are consistent.

The two activation modes are illustrated herein below with reference to FIG. 2 and FIG. 3 respectively.

Figure 2:
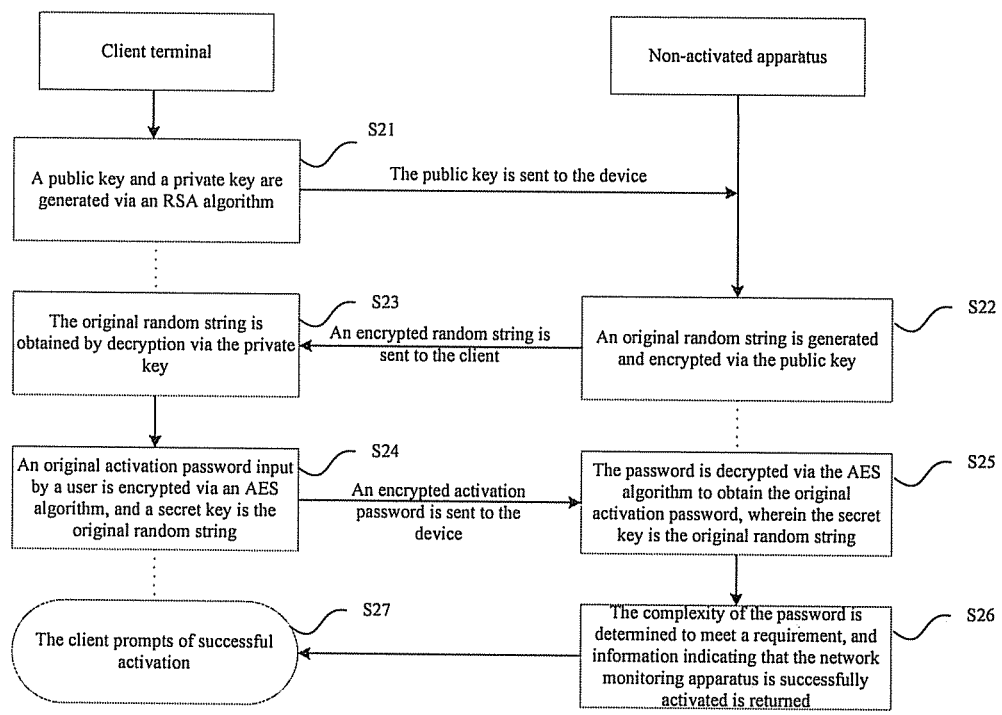
FIG. 2 is a flowchart of remote activation based on an Internet Protocol (IP) address according to an exemplary embodiment of the present disclosure.

FIG. 2 is a flowchart of remote activation based on an IP address according to an exemplary embodiment of the present disclosure. The activation mode based on the IP address refers to activation via directional network connection to a certain network monitoring apparatus.

At step S21, a client terminal calls a first algorithm to generate a public key and a private key, and the client terminal sends the public key to a non-activated network monitoring apparatus.

At step S22, the network monitoring apparatus receives the public key generated by the client terminal via the first algorithm, and encrypts an original random string generated by the network monitoring apparatus via the public key to generate an encrypted random string. The network monitoring apparatus returns the encrypted random string to the client terminal. Specifically, the network monitoring apparatus encrypts an original random string (a generated random string without any encryption operation) via the public key to obtain an encrypted random string, and returns the encrypted random string to the client terminal.

At step S23, the client terminal decrypts the encrypted random string via the first algorithm to obtain the original random string.

At step S24, the client terminal sets the decrypted original random string as an encryption key of a second algorithm, and encrypts an original activation password via the second algorithm to obtain an activation password. Then, the activation password is sent to the network monitoring apparatus.

At step S25, the network monitoring apparatus receives the activation password encrypted by the client terminal via the second algorithm. Since the encryption key is the original random string generated by the network monitoring apparatus, the network monitoring apparatus decrypts the activation password via the second algorithm to obtain the original activation password.

At step S26, the network monitoring apparatus determines whether a complexity of the decrypted original activation password meets a predetermined password strength requirement. When a complexity of the decrypted original activation password meets the predetermined password strength requirement, the network monitoring apparatus is activated, and information indicating that the network monitoring apparatus is successfully activated is returned to the client terminal.

At step S27, the client terminal prompts the user that the network monitoring apparatus is successfully activated.

Figure 3:
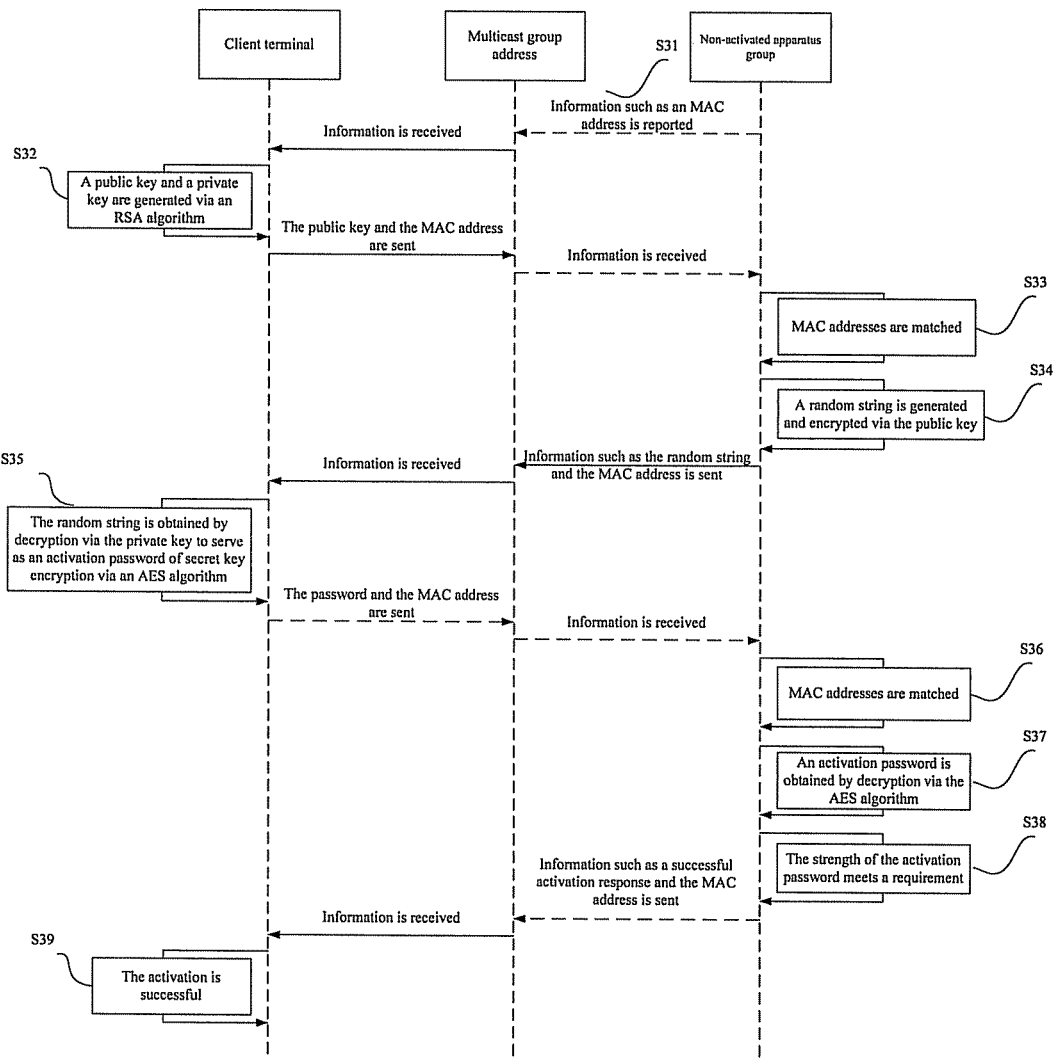
FIG. 3 is a flowchart of remote activation based on an MAC address according to an exemplary embodiment of the present disclosure.

FIG. 3 is a flowchart of remote activation based on an MAC address according to an exemplary embodiment of the present disclosure. Since factory settings of a network monitoring apparatus include a fixed IP address usually, IP addresses are identical when many devices are put together. In this case, an activation mode based on an IP address cannot visually determine the network monitoring apparatus activated in this mode. An MAC is unique to each network monitoring apparatus. That is, the MAC address is used for uniquely identifying an identity of each network monitoring apparatus. Therefore, the activation mode based on the MAC address solves the above-mentioned problem, and interaction is realized via multicast.

It is important to note that in the following steps, since there are multiple network monitoring apparatuses, network interaction between a client terminal and multiple network monitoring apparatuses is realized in a multicast form. Multicast is a one-to-multiple-point communication mode, information sent between the network monitoring apparatuses and the client terminal is sent to a specific multicast group firstly, and any network device joining into this multicast group receives data. The MAC address is set as a matching basis of each network monitoring apparatus, so that the client terminal can visually determine the network monitoring apparatus that is currently activated. The mode is particularly applied to a scenario where network monitoring apparatuses are activated in batches, and network bandwidth is saved.

At step S31, an MAC address of a network monitoring apparatus is reported to a client terminal.

Each network monitoring apparatus sends an own MAC address to the client terminal in a multicast form.

At step S32, the client terminal generates a public key and a private key via a first algorithm, and sends the public key and an MAC address to the network monitoring apparatus.

At step S33, the network monitoring apparatus determines whether the received MAC address is matched with the MAC address of the network monitoring apparatus. And when the received MAC address is matched with the MAC address of the network monitoring apparatus, step S34 is executed. In other words, the network monitoring apparatus receives the public key matched with the MAC address of the network monitoring apparatus, and step S34 is executed.

At step S34, the network monitoring apparatus generates an original random string, encrypts the original random string via the public key to obtain an encrypted random string, and sends the encrypted random string and the MAC address to the client terminal.

At step S35, the client terminal decrypts the encrypted random string via the private of the first algorithm to obtain the original random string, sets the original random string as a key of a second algorithm, encrypts an original activation password to obtain an activation password, and sends the activation password encrypted via the second algorithm and the address to the network monitoring apparatus.

At step S36, the network monitoring apparatus determines whether the received MAC address is matched with the MAC address of the network monitoring apparatus again, and when the received MAC address is matched with the MAC address of the network monitoring apparatus, step S37 is executed. In other words, the network monitoring apparatus receives the public key matched with the MAC address of the network monitoring apparatus, and step S37 is executed.

At step S37, the network monitoring apparatus decrypts the activation password via the second algorithm. Since the encryption key is the original random string generated by the network monitoring apparatus, the network monitoring apparatus decrypts the activation password to obtain the original activation password.

At step S38, the network monitoring apparatus determines whether the complexity of the original activation password meets a predetermined password strength requirement. When the complexity of the original activation password meets a predetermined password strength requirement, the network monitoring apparatus is activated, and information indicating that the network monitoring apparatus is successfully activated is returned to the client terminal.

At step S39, the client terminal prompts the user that the network monitoring apparatus is successfully activated.

To sum up, the activation mode based on the MAC address is identical to the activation mode based on the IP address in terms of encryption algorithms and passwords and are slightly different in network interaction. The activation mode based on the MAC address realizes one-to-multiple network interaction in a multicast form.

In one embodiment of the present disclosure, in the activation mode based on the IP address and the activation mode based on the MAC address, the first algorithm is an asymmetric encryption RSA algorithm, and the second algorithm is an AES symmetric encryption algorithm.

The RSA algorithm is an asymmetric encryption algorithm, a pair of keys including a public key and a private key is generated by using the RSA algorithm. The public key is open to public, and the private key is kept by a generator. In the present disclosure, the private key generated by the RSA algorithm is kept by a generator client terminal. During encryption, is encrypted by using the public key, and the encrypted data is decrypted by using the private key. As long as a key is long enough, the password cannot be cracked. When the network monitoring apparatus is activated each time, a new RSA key pair will be generated, and the private key is stored in a client terminal memory and is unlikely to be captured.

The AES algorithm is a symmetric encryption algorithm. An encryption party or a decryption party encrypts or decrypts data by using the same key. Although the symmetric encryption mode is unsecure, since the prevent disclosure performs encryption processing of the RSA algorithm on the key of the AES algorithm in advance, the key cannot be obtained by sniffing and other means, thereby improving the security of the network monitoring apparatus.

In the remote activation method of a network monitoring apparatus provided in at least some embodiments of the present disclosure, a default password is not set for the network monitoring apparatus, and the network monitoring apparatus cannot be used before being activated, that is, the network monitoring apparatus is able to be used after being activated by the user, so that an old bad habit of always using the default password by the user is changed. Moreover, an original activation password input by the user is subjected to strength check, and a too simple password is not allowed to be used for activating the network monitoring apparatus, such that an illegal user cannot remotely control the monitoring apparatus by using the default password or guessing a current password that is too simple, thereby improving password security. Besides, the present disclosure combines a RSA asymmetric encryption algorithm and an AES symmetric encryption algorithm in a process of encrypting the original activation password input by the user, and it is difficult to crack the activation password input by the user from a network, thereby further enhancing the security of an activation process.

Figure 4:
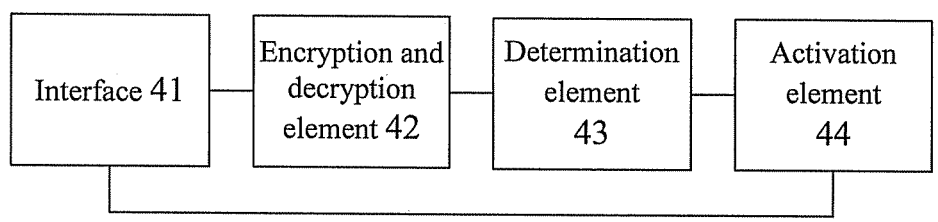
FIG. 4 is a structural block diagram of a network monitoring apparatus according to an exemplary embodiment of the present disclosure.

FIG. 4 is a structural block diagram of a network monitoring apparatus according to an exemplary embodiment of the present disclosure.

As shown in FIG. 4, the network monitoring apparatus provided in the present disclosure includes: an interface 41, an encryption and decryption element 42, a determination element 43 and an activation element 44.

Specifically, the interface 41 is arranged to receive an encrypted activation password sent by a client terminal. That is, after the user inputs an original activation password, the client terminal encrypts the original activation password, and then sends the encrypted activation password to the interface 41.

The encryption and decryption element 42 is arranged to decrypt the encrypted activation password to obtain the original activation password.

The determination element 43 is arranged to determine whether the original activation password meets a predetermined password strength requirement. The determination element 43 analyzes the complexity of the decrypted original activation password, i.e., checks whether the complexity (namely password strength) of a password set by the user meets the predetermined password strength requirement. For example, the predetermined password strength requirement satisfies the following conditions: combination of numbers, capital letters and lowercase letters, and a password length is at least 8 bits. At this time, when an original activation password input by the user is U0123CRRT, the password is determined to be unqualified due to the fact that the password does not have a lowercase letter and the password length does not reach 8 bits.

The activation element 44 is arranged to activate, when the original activation password meets the predetermined password strength requirement, the network monitoring apparatus, and set the original activation password as an administrator password. Then, the interface 41 returns information indicating that the network monitoring apparatus is successfully activated to the client terminal. When the original activation password does not meet the predetermined password strength requirement, the network monitoring apparatus returns information to the client terminal, and this information is used for indicating that the network monitoring apparatus is not successfully activated.

It is important to note that the remote activation method of a network monitoring apparatus of the present disclosure includes: an activation mode based on an IP address and an activation mode based on an MAC address according to different network interaction modes, and the difference between the two activation modes lies in network interaction, and encryption modes of the two activation modes are consistent.

The two activation modes are illustrated herein below respectively.

(1) An activation mode based on an IP address: activation via directional network connection to a certain network monitoring apparatus.

The client terminal calls a first algorithm to generate a public key and a private key, and the client terminal sends the public key to the non-activated interface 41. The interface 41 receives the public key generated by the client terminal via the first algorithm, and returns a random string encrypted via the public key to the client terminal. The encrypted random string is obtained by encrypting, by the encryption and decryption element 42, an original random string generated by the network monitoring apparatus via the public key.

The client terminal decrypts the encrypted random string via the private key of the first algorithm to obtain the original random string, sets the decrypted original random string as an encryption key of a second algorithm, encrypts an original activation password input by a user via the second algorithm to obtain an activation password, and then sends the activation password to the interface 41. The interface 41 receives the activation password encrypted by the client terminal via the second algorithm. The encryption and decryption element 42 decrypts the activation password via the second algorithm to obtain the original activation password. The determination element 43 determines whether the complexity of the original activation password meets a predetermined password strength requirement. The activation element 44 activates, when the complexity of the original activation password meets the predetermined password strength requirement, the network monitoring apparatus, and returns information indicating that the network monitoring apparatus is successfully activated to the client terminal. The client terminal further prompts the user that the network monitoring apparatus is successfully activated.

(2) An activation mode based on an MAC address: the MAC address is unique to each network monitoring apparatus. That is, the MAC address is used for uniquely identifying the identity of the network monitoring apparatus. Therefore, the activation mode based on an MAC address solves the above-mentioned problem, and network interaction is realized via multicast. Since there are multiple network monitoring apparatuses, network interaction between a client terminal and multiple network monitoring apparatuses is realized in a multicast form. Multicast is a one-to-multiple-point communication mode, information sent between the network monitoring apparatuses and the client terminal is sent to a specific multicast group firstly, and any network device joining into this multicast group receives data. The MAC address is set as a matching basis of each network monitoring apparatus, so that the client terminal can visually determine the network monitoring apparatus that is currently activated. The mode is particularly applied to a scenario where network monitoring apparatuses are activated in batches, and network bandwidth is saved.

Each network monitoring apparatus sends an MAC address to the client terminal a multicast form. The client terminal generates a public key and a private key via a first algorithm, and sends the public key and an MAC address to the interface 41. The interface 41 receives the returned public key and MAC address generated via the first algorithm, and a random string encrypted via the public key to the client terminal after determining that the received MAC address is matched with the MAC address of the present network monitoring apparatus. That is, after the network monitoring apparatus receives the public key matched with the MAC address of the network monitoring apparatus, and the client terminal decrypts encrypted random string via the private key of the first algorithm to obtain an original random string, sets the original random string as a key of a second algorithm, and encrypts an original activation password input by a user to obtain an activation password.

The interface 41 receives an activation password encrypted by the client terminal via the second algorithm and MAC address, and the key of the second algorithm is an original random string. After determining that the MAC address received again is matched with the MAC address of the present network monitoring apparatus, that is after the network monitoring apparatus receives the activation password matched with the MAC address of the network monitoring apparatus, the encryption and decryption element 42 decrypts the activation password via the second algorithm to obtain the original activation password. The determination element 43 determines whether the complexity of the original activation password meets a predetermined password strength requirement. The activation element 44 activates, when the complexity of the original activation password meets the predetermined password strength requirement, the network monitoring apparatus, and returns information indicating that the network monitoring apparatus is successfully activated to the client terminal. The client terminal further prompts the user that the network monitoring apparatus is successfully activated.

It is important to note that the interface 41, the encryption and decryption element 42, the determination element 43 and the activation element 44 run in a computer terminal as a part of the apparatus, functions implemented by elements can be executed via a processor in the computer terminal, and the computer terminal is a terminal device such as a smart phone (such as Android phone and an iOS phone), a tablet computer, a palmtop, Mobile Internet Devices (MID), and a PAD.

In one embodiment of the present disclosure, in an activation mode based on an IP address and an activation mode based on an MAC address, the first algorithm is a RSA asymmetric encryption algorithm, and the second algorithm is an AES symmetric encryption algorithm.

In the network monitoring apparatus provided in at least some embodiments of the present disclosure, a default password is not set for a network monitoring apparatus, and the network monitoring apparatus cannot be used before being activated, that is, the network monitoring apparatus is able to be used after being activated by a user, so that an old bad habit of always using the default password by the user is changed. Moreover, an original activation password input by the user is subjected to strength check, and a too simple password is not allowed to be used for activating the device, such that an illegal user cannot remotely control the monitoring apparatus by using the default password or guessing a current password that is too simple, thereby improving password security. Besides, the present disclosure combines a RSA asymmetric encryption algorithm and an AES symmetric encryption algorithm in a process of encrypting an original activation password input by a user, and it is difficult to the activation password input by the user from a network, thereby further enhancing a security of an activation process.

Figure 5:
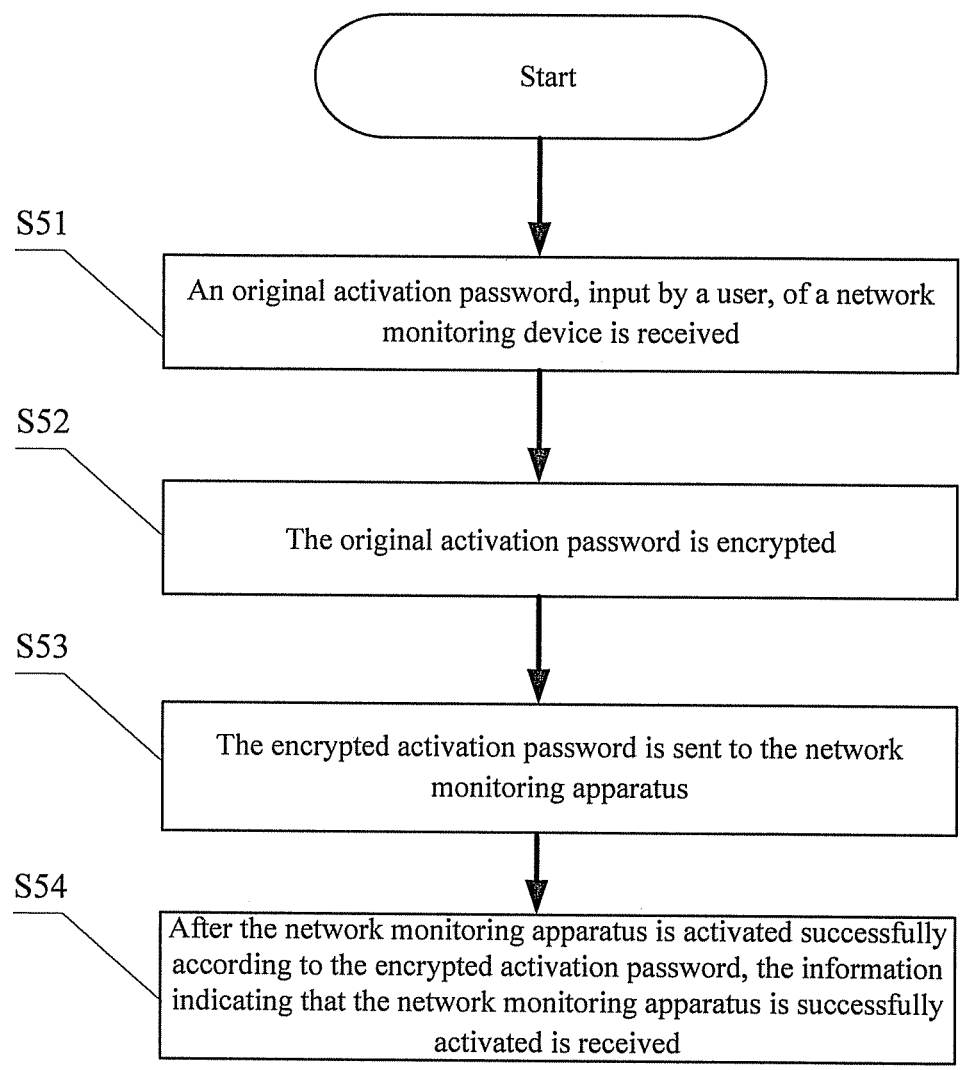
FIG. 5 is a flowchart of an encryption method of a network monitoring apparatus based on a client terminal according to an exemplary embodiment of the present disclosure.

FIG. 5 is a flowchart of an encryption method of a network monitoring apparatus based on a client terminal according to an exemplary of the present disclosure. It is important to note that an executed object of the encryption method of the network monitoring apparatus based on the client terminal is the client terminal, that is, the client terminal completes the steps as follows.

At step S51, an original activation password of a network monitoring apparatus is received.

At step S52, the original activation password is encrypted.

Specifically, the client terminal further sends the encrypted activation password to the network monitoring apparatus, and the network monitoring apparatus determines whether the original activation password meets a predetermined password strength requirement, activates, when the original activation password meets the predetermined password strength requirement, the network monitoring apparatus, sets the original activation password as an administrator password, and returns information indicating that the network monitoring apparatus is successfully activated to the client terminal.

When being used for activating the network monitoring apparatus, the encryption method of the network monitoring apparatus based on the client terminal of the present disclosure includes: an activation mode based on an IP address and an activation mode based on an MAC address according to different network interaction modes. The difference between two activation modes lies in network interaction, and encryption modes of the two activation modes are consistent.

(1) Activation mode based on the IP address

The client terminal adopts a first algorithm to generate a public key and a private key, and sends the public key to the network monitoring apparatus. The network monitoring apparatus encrypts an original random string generated by the network monitoring apparatus via the public key to generate an encrypted random string. The client terminal receives the encrypted random string sent by the network monitoring apparatus, decrypts the random string that is returned by the network monitoring apparatus and encrypted via the public key, and sets an obtained original random string as a key of a second algorithm. Then, an original activation password input by a user is encrypted via the second algorithm to obtain an activation password, and the encrypted activation password is sent to the network monitoring apparatus Activation mode based on the MAC address The client terminal receives MAC addresses reported by multiple network monitoring apparatuses. The MAC addresses are used for uniquely identifying the identity of the network monitoring apparatus. The client terminal adopts a first algorithm to generate a public key and a private key, and sends the public key and the MAC address to the network monitoring apparatus. Specifically, the client terminal sends the public key matched with the MAC address of the network monitoring apparatus to the network monitoring apparatus. The network monitoring apparatus encrypts an original random string generated by the network monitoring apparatus via the public key to generate an encrypted random string. Then, the client terminal receives the encrypted random string sent by the network monitoring apparatus. Further, the step of receiving, by the client terminal, the encrypted random string sent by the network monitoring apparatus further includes: receiving an MAC address sent by the network monitoring apparatus, and the MAC address is used for uniquely identifying the identity of the network monitoring apparatus.

The client terminal decrypts the encrypted random string via the private key, and sets the original random string as a key of a second algorithm. An original activation password input by a user is encrypted via the second algorithm to obtain an activation password, and the encrypted activation password is sent to the network monitoring apparatus. Specifically, the client terminal sends an activation password matched with the MAC address of the network monitoring apparatus to the network monitoring apparatus.

In one embodiment of the present disclosure, in the activation mode based on the address and the activation mode based on the MAC address, the first algorithm is a RSA asymmetric encryption algorithm, and the second algorithm is an AES symmetric encryption algorithm.

At step S53, the encrypted activation password is sent to the network monitoring apparatus.

Since the encryption key is the original random string generated by the network monitoring apparatus, the network monitoring apparatus decrypts the activation password via the second algorithm to obtain the original activation password input by the user.

At step S54, after the network monitoring apparatus is activated successfully according to the encrypted activation password, the information indicating that the network monitoring apparatus is successfully activated is received.

The network monitoring apparatus determines whether the complexity of the decrypted original activation password meets a predetermined password strength requirement. When the complexity of the decrypted original activation password meets the predetermined password strength requirement, the network monitoring apparatus is activated, and the information indicating that the network monitoring apparatus is successfully activated is returned to the client terminal. Otherwise, the information indicating that the network monitoring apparatus is not successfully activated is returned to the client terminal. The client terminal prompts the user that the network monitoring apparatus is successfully activated.

In the encryption method of the network monitoring apparatus based on the client terminal provided in at least some embodiments of the present disclosure, a default password is not set for the network monitoring apparatus, and the network monitoring apparatus cannot be used before being activated, that is, the network monitoring apparatus is able to be used after being activated by a user, so that an old bad habit of always using the default password by the user is changed. Moreover, an original activation password input by the user is subjected to strength check, and a too simple password is not allowed to be used for activating the device, such that an illegal user cannot remotely control the monitoring apparatus by using the default password or guessing a current password that is too simple, thereby improving password security. Besides, the present disclosure combines a RSA asymmetric encryption algorithm and an AES symmetric encryption algorithm in a process of encrypting an original activation password input by a user, and it is difficult to crack the activation password input by the user from a network, thereby further enhancing a security of an activation process.

Figure 6:
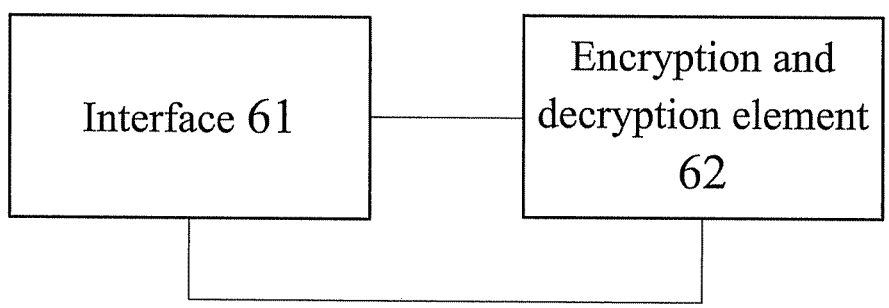
FIG. 6 is a structural block diagram of a client terminal according to an exemplary embodiment of the present disclosure.

FIG. 6 is a structural block diagram of a client terminal according to an exemplary embodiment of the present disclosure.

As shown in FIG. 6, the client terminal in this exemplary embodiment of the present disclosure includes: an interface 61 and an encryption and decryption element 62.

Specifically, the interface 61 is arranged to receive an original activation password of a network monitoring apparatus.

The encryption and decryption element 62 is arranged to encrypt the original activation password. The interface 61 further sends the encrypted activation password to the network monitoring apparatus, and the network monitoring apparatus determines whether the original activation password meets a predetermined password strength requirement, activates, when the original activation password meets the predetermined password strength requirement, the network monitoring apparatus, sets the original activation password as an administrator password, and returns information indicating that the network monitoring apparatus is successfully activated to the client terminal.

When being used to activate the network monitoring apparatus, the client terminal in this exemplary embodiment of the present disclosure includes: an activation mode based on an IP address and an activation mode based on an MAC address according to different network interaction modes. The difference between two activation modes lies in network interaction, and encryption modes of the two activation modes are consistent.

(1) Activation mode based on an IP address

The encryption and decryption element 62 adopts a first algorithm to generate a public key and a private key, and sends the public key to the network monitoring apparatus. The network monitoring apparatus encrypts an original random string generated by network monitoring apparatus via the public key to generate an encrypted random string. The interface 61 receives the encrypted random string sent by the network monitoring apparatus, decrypts the random string that is returned by the network monitoring apparatus and encrypted via the public key, and sets an obtained original random string as a key of a second algorithm. Then, the encryption and decryption element 62 encrypts an original activation password via the second algorithm to obtain an activation password, and sends the encrypted activation password to the network monitoring apparatus.

(2) Activation mode based on an MAC address

The interface 61 receives MAC addresses reported by multiple network monitoring apparatuses, and the MAC addresses are respectively used for uniquely identifying an identity of each network monitoring apparatus. The encryption and decryption element 62 adopts a first algorithm to generate a public key and a private key, and sends the public key and the MAC address to the network monitoring apparatus. Specifically, the interface 61 sends the public key matched with the MAC address of the network monitoring apparatus to the network monitoring apparatus. The network monitoring apparatus encrypts an original random string generated by the network monitoring apparatus via the public key to generate an encrypted random string. Then, the interface 61 receives the encrypted random string sent by the network monitoring apparatus. Further, the operation of receiving, by the interface 61, the encrypted random string sent by the network monitoring apparatus further includes: receiving an MAC address sent by the network monitoring apparatus, and the MAC address is used for uniquely identifying the identity of the network monitoring apparatus. The encryption and decryption element 62 decrypts the encrypted random string via the private key to obtain an activation password, and sets the original random string as a key of a second algorithm. The encryption and decryption element 62 encrypts an original activation password via the second algorithm to obtain the encrypted activation password. Specifically, the interface 61 sends an activation password matched with the MAC address of the network monitoring apparatus to the network monitoring apparatus.

In one embodiment of the present disclosure, in the activation mode based on the IP address and the activation mode based on the MAC address, the first algorithm is a RSA asymmetric encryption algorithm, and the second algorithm is an AES symmetric encryption algorithm.

The interface 61 sends the encrypted activation password to the network monitoring apparatus. Since the encryption key is the original random string generated by the network monitoring apparatus, the network monitoring apparatus decrypts the activation password via the second algorithm to obtain the original activation password.

The network monitoring apparatus determines whether the complexity of the decrypted original activation password meets a predetermined password strength requirement. When the complexity of the decrypted original activation password meets the predetermined password strength requirement, the network monitoring apparatus is activated, and the information indicating that the network monitoring apparatus is successfully activated is returned to the interface 61. Otherwise, the information indicating that the network monitoring apparatus is not successfully activated is returned to the interface 61. The client terminal prompts the user that the network monitoring apparatus is successfully activated.

In the client terminal provided in at least some embodiments of the present disclosure, a default password is not set for the network monitoring apparatus, and the network monitoring apparatus cannot be used before being activated, that is, the network monitoring apparatus is able to be used after being activated by a user, so that an old bad habit of always using the default password by the user is changed. Moreover, an original activation password is subjected to strength check, and a too simple password is not allowed to be used for activating the device, such that an illegal user cannot remotely control the monitoring apparatus by using the default password or guessing a current password that is too simple, thereby improving password security. Besides, the present disclosure combines a RSA asymmetric encryption algorithm and an AES symmetric encryption algorithm in a process of encrypting an original activation password, and it is difficult to crack the activation password input by the user from a network, thereby further enhancing a security of an activation process.

Figure 7:
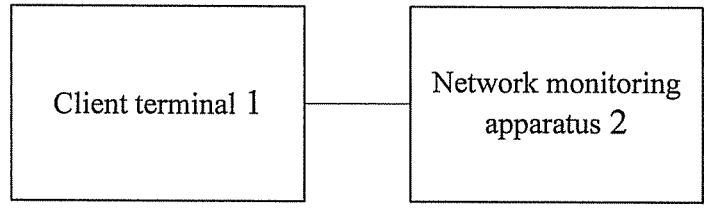
FIG. 7 is a structural block diagram of a remote activation system based on a network monitoring apparatus according to an exemplary embodiment of the present disclosure.

FIG. 7 is a structural block diagram of a remote activation system based on a network monitoring apparatus according to an exemplary embodiment of the present disclosure.

Specifically, the remote activation system based on the network monitoring apparatus in this exemplary embodiment of the present disclosure includes: a client terminal 1 and a network monitoring apparatus 2.

The client terminal 1 is arranged to receive an original activation password of the network monitoring apparatus 2, and encrypt the original activation password. Specifically, the client terminal 1 sends a public key generated via a first algorithm to the network monitoring apparatus 2. The network monitoring apparatus 2 encrypts an original random string generated by the network monitoring apparatus via the public key to generate an encrypted random string. The client terminal 2 decrypts the encrypted random string returned by the network monitoring apparatus 2 by using a private key generated via the first algorithm to obtain the original random string. The client terminal 1 sets the obtained original random string as a key of a second algorithm, encrypts the original activation password via the second algorithm to obtain an encrypted activation password, and sends the encrypted activation password to the network monitoring apparatus 2.

Specifically, the original activation password is encrypted in a mode based on an IP address and a mode based on an MAC address.

The network monitoring apparatus 2 is arranged to receive the encrypted activation password from the client terminal 1, decrypt the encrypted activation password to obtain the original activation password input by the user, determine whether the original activation password meets a predetermined password strength requirement, activate when the original activation password meets the predetermined password strength requirement, the network monitoring apparatus and set the original activation password as an administrator password, and return information indicating that the network monitoring apparatus is successfully activated to the client terminal 1. After receiving the information indicating that the network monitoring apparatus is successfully activated, the client terminal 1 sends a prompt to the user to indicate that the network monitoring apparatus is successfully activated.

It is important to note that the remote activation system based on the network monitoring apparatus of the present disclosure includes: an activation mode based on an IP address and an activation mode based on an MAC address according to different network interaction modes. The difference between two activation modes lies in network interaction, and encryption modes of the two activation modes are consistent.

(1) Activation mode based on the IP address

The client terminal 1 adopts a first algorithm to generate a public key, sends the public key to the network monitoring apparatus 2, decrypts a random string that is returned by the network monitoring apparatus 2 and encrypted via the public key, sets an obtained original random string as a key of a second algorithm, encrypts an original activation password via the second algorithm to obtain an encrypted activation password, and sends the encrypted activation password to the network monitoring apparatus 2.

(2) Activation mode based on the MAC address

The client terminal receives MAC addresses reported by multiple network monitoring apparatuses, adopts a first algorithm to generate a public key and a private key, and sends the public key and the MAC address to each of the network monitoring apparatuses. Then, a random string that is returned by each of the network monitoring apparatuses and encrypted via the public key is decrypted, and an obtained original random string is set as a key of a second algorithm. An original activation password is encrypted via the second algorithm, and the encrypted activation password is sent to each of the network monitoring apparatuses.

In one embodiment of the present disclosure, in the activation mode based on the IP address and the activation mode based on the MAC address. The first algorithm is a RSA asymmetric encryption algorithm, and the second algorithm is an AES symmetric encryption algorithm.

Figure 8:
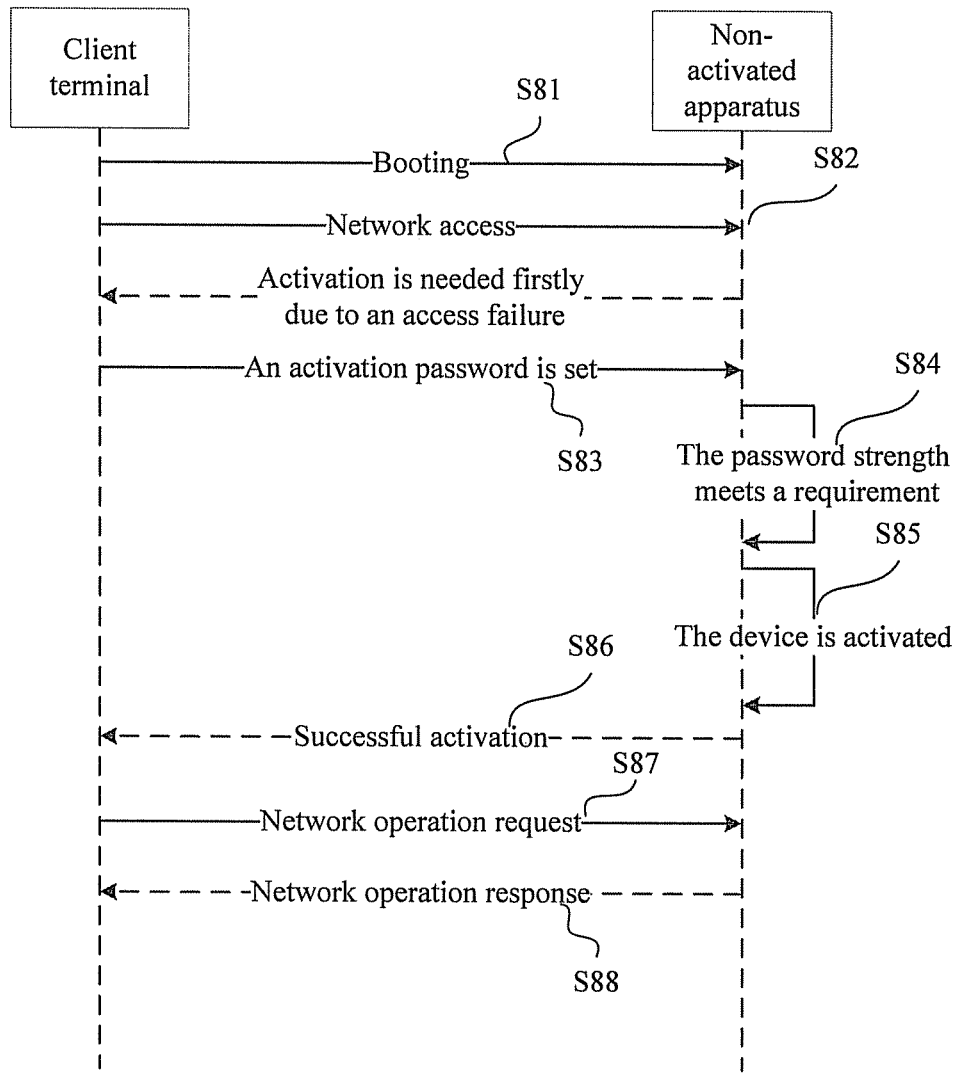
FIG. 8 is an activation flowchart of a remote activation system based on a network monitoring apparatus according to an exemplary embodiment of the present disclosure.

FIG. 8 is an activation flowchart of a remote activation system based on a network monitoring apparatus according to an exemplary embodiment of the present disclosure.

At step S81, a user sends a booting instruction to a non-activated network monitoring apparatus 2 via a client terminal 1, and after receiving the booting instruction, the non-activated network monitoring apparatus 2 completes a booting action.

At step S82, the user further sends a network access request to the non-activated network monitoring apparatus 2 via the client terminal 1. Since the network monitoring apparatus is not activated, access fails, and then the user executes an activation operation firstly.

At step S83, the client terminal 1 encrypts an original activation password of the network monitoring apparatus 2 to obtain an activation password, and sends the encrypted activation password to the network monitoring apparatus 2.

At step S84, the network monitoring apparatus 2 receives the encrypted activation password from the client terminal 1, decrypts the encrypted activation password, obtains the original activation password, and determines whether the original activation password meets a predetermined password strength requirement. When the original activation password meets the predetermined password strength requirement, step S85 is executed.

At step S85, the network monitoring apparatus 2 activates the network monitoring apparatus, and sets the original activation password as an administrator password.

At step S86, the network monitoring apparatus 2 returns information indicating that the network monitoring apparatus is successfully activated to the client terminal 1.

At step S87, the client terminal 1 sends a specific network operation request to the network monitoring apparatus 2 already activated.

At step S88 the network monitoring apparatus 2 returns, in response to the network operation request, a network operation response to the client terminal 1.

In the remote activation system based on the network monitoring apparatus provided in at least some embodiments of the present disclosure, a default password is not set for the network monitoring apparatus, and the network monitoring apparatus cannot be used before being activated, that is, the network monitoring apparatus is able to be used after being activated by a user, so that an old bad habit of always using the default password by the user changed. Moreover, an original activation password input by the user is subjected to strength check, and a too simple password is not allowed to be used for activating the device, such that an illegal user cannot remotely control the monitoring apparatus by using the default or guessing a current password that is too simple, thereby improving password security. Besides, the present disclosure combines a RSA asymmetric encryption algorithm and an symmetric encryption algorithm in a process of encrypting an original activation password input by a user, and it is difficult to crack the activation password input by the user from a network, thereby further enhancing a security of an activation process.

It will be appreciated that the above-mentioned exemplary embodiments of the present disclosure are used for exemplarily illustrating or explaining the principle of the present disclosure, and does not form limitation to the present disclosure. Therefore, any modification, equivalent replacements and improvements made without departing from the spirit and scope of the present disclosure should fall within the scope of protection of the present disclosure. Besides, the appended claims of the present disclosure aim to cover all change and modification examples falling within the scope and boundary of the appended claims or an equivalent form of this scope and boundary.

In one embodiment of the present disclosure, a computer terminal is provided. The computer terminal is any one computer terminal device in a computer terminal group. Alternatively, in the present embodiment, the computer terminal is also replaced with a terminal device such as a mobile terminal.

Alternatively, in the present embodiment, the computer terminal is located on at least one network device in multiple network devices of a computer network.

In the present embodiment, the computer terminal executes program codes for the following steps in the remote activation method of a network monitoring apparatus: receiving an encrypted activation password sent by a client terminal; decrypting the encrypted activation password to obtain an original activation password; determining whether the original activation password meets a predetermined password strength requirement; when the original activation password meets the predetermined password strength requirement, activating the network monitoring apparatus and setting the original activation password as an administrator password; and returning information indicating that the network monitoring apparatus is successfully activated to the client terminal.

Alternatively, the computer terminal includes: one or more processors, a memory and a transmission apparatus.

The memory is arranged to store a software program and a component, such as a program instruction/component corresponding to a remote activation method of a network monitoring apparatus in at least one embodiment of the present disclosure. The processor executes various function applications and data processing by running the software program and the component stored in the memory, namely implementing the above-mentioned remote activation method of a network monitoring apparatus. The memory includes a high-speed Random Access Memory (RAM), and further includes a non-volatile memory such as one or more disk storage apparatuses, a flash, or other non-volatile solid memories. In some examples, the memory further includes memories remotely arranged relative to the processor. These remote memories are connected to a terminal via a network. The examples for the network include, but not limited to, internet, intranet, local area network, mobile communication network and combination of the internet, the intranet, the local area network and the mobile communication network.

The transmission apparatus is arranged to receive or send data via a network. A specific example for the network includes at least one of a cable network and a radio network. In an example, the transmission apparatus includes a Network Interface Controller (NIC), which is connected to a router via a network cable and other network devices, so as to communicate with the internet or the local area network. In an example, the transmission apparatus is a Radio Frequency (RF) component, arranged to communicate with the internet in a radio manner.

Specifically, the memory is arranged to store predetermined action conditions, predetermined permission user information, and application programs.

The processor calls information and application programs stored by the memory via the transmission apparatus, so as to execute program codes for the method steps of each alternative or exemplary embodiment in the above-mentioned method embodiments.

A person of ordinary skill in the art may understand that the computer terminal is also a terminal device such as a smart phone (such as Android phone and an iOS phone), a tablet computer, a palmtop, MID, and a PAD.

A person of ordinary skill in the art may understand that all or some steps in each method in the above-mentioned embodiments are completed by instructing relevant hardware of the terminal device through a program. And the program is stored in a computer-readable storage medium, and the storage medium includes: a flash disk, a Read-Only Memory an RAM, a magnetic disk or an optical disk.

In one embodiment of the present disclosure, a storage medium is also provided. Alternatively, in the present embodiment, the storage medium is arranged to store program codes executed for a remote activation method of a network monitoring apparatus provided in the above-mentioned method embodiments and apparatus embodiments.

Alternatively, in the present embodiment, the storage medium is located in any one computer terminal in a computer terminal group in a computer network, or located in any one mobile terminal in a mobile terminal group.

Alternatively, in the present embodiment, the storage medium is arranged to store program codes for executing the following steps: receiving an encrypted activation password sent by a client terminal; decrypting the encrypted activation password to obtain an original activation password; determining whether the original activation password meets a predetermined password strength requirement; when the original activation password meets the predetermined password strength requirement, activating the network monitoring apparatus and setting the original activation password as an administrator password; and returning information indicating that the network monitoring apparatus is successfully activated to the client terminal.

Alternatively, in the present embodiment, the storage medium is also arranged to store program codes for executing each exemplary or alternative method step provided in a remote activation method of a network monitoring apparatus.

The serial numbers of the embodiments of the present disclosure are used for descriptions, and do not represent the preference of the embodiments.

In the above-mentioned embodiments of the present disclosure, descriptions for each embodiment are emphasized respectively, and parts which are not elaborated in a certain embodiment may refer to relevant descriptions of other embodiments.

In some embodiments provided by the present application, it will be appreciated the disclosed technical contents are implemented in other modes. Herein, the apparatus embodiment described above is schematic. For example, division of the elements is division of logical functions, and there are additional division modes during actual implementation. For example, a plurality of elements or components are combined or integrated to another system, or some features are omitted or are not executed. In addition, displayed or discussed mutual coupling or direct coupling or communication connection is performed via some interfaces, and indirect coupling or communication connection between elements or components are in an electrical form or other forms.

The elements illustrated as separate parts are or are not physically separated. Parts for element display are or are not physical elements. That is, the parts are located at a place or are distributed on a plurality of elements. The aims of the solutions of the embodiments are achieved by selecting some or all elements according to actual requirements.

In addition, all function elements in all embodiments of the present disclosure are integrated in a processing element, or each element exists separately and physically, or two or more elements are integrated in a element. The integrated element is implemented in a hardware form or is implemented in a form of software function element.

When being implemented in a form of software function element and is sold or used as an independent product, the integrated element is stored in a computer-readable storage medium. Based on this understanding, the technical solutions of the present disclosure are substantially embodied in a form of software product or parts contributing to the related art or all or some of the technical solutions are embodied in a form of software product, and the computer software product is stored in a storage medium which includes a plurality of instructions enabling a computer device (which is a personal computer, a server, a network device or the like) to execute all or some of the steps of the method according to each embodiment of the present disclosure. The above-mentioned storage medium includes: various media capable of storing program codes, such as a U disk, an ROM, an RAM, a mobile hard disk, a magnetic disk or an optical disk.

The above are exemplary implementation manners of the present disclosure. It should be pointed out that a person of ordinary skill in the art can also make some improvements and modifications without departing from the principle of the present These improvements and modifications should fall within the scope of protection of the disclosure.

What is claimed is:

1. A remote activation method of a non-activated network monitoring apparatus, comprising:
   the non-activated network monitoring apparatus receiving an encrypted activation password sent by a client terminal;
   the non-activated network monitoring apparatus decrypting the encrypted activation password to obtain an original activation password;
   the non-activated network monitoring apparatus determining whether the original activation password meets a predetermined password strength requirement;
   when the original activation password meets the predetermined password strength requirement, the non-activated network monitoring apparatus being activated and setting the original activation password as an administrator password; and
   the activated network monitoring apparatus returning information indicating that the non-activated network monitoring apparatus is successfully activated to the client terminal,
   wherein no default password is set for the non-activated network monitoring apparatus,
   wherein receiving the encrypted activation password sent by the client terminal comprises: receiving a public key sent by the client terminal and generated via a first algorithm, encrypting an original random string generated by the non-activated network monitoring apparatus via the public key to generate an encrypted random string, returning the encrypted random string to the client terminal; and receiving an activation password sent by the client terminal and encrypted via a second algorithm, wherein the activation password is generated by encrypting an original activation password via the second algorithm, wherein a key of the second algorithm is the original random string,
   wherein before receiving the public key sent by the client terminal and generated via the first algorithm, the remote activation method further comprises: reporting a Media Access Control (MAC) address to the client terminal, wherein the MAC address is used for uniquely identifying an identity of the non-activated network monitoring apparatus;
   or wherein while returning the encrypted random string to the client terminal, the remote activation method further comprises: reporting a MAC address to the client terminal, wherein the MAC address is used for uniquely identifying an identity of the non-activated network monitoring apparatus;
   or wherein the first algorithm is a RSA asymmetric encryption algorithm.

2. The remote activation method of the non-activated network monitoring apparatus as claimed in claim 1, wherein decrypting the encrypted activation password to obtain the original activation password comprises: decrypting the activation password via the second algorithm to obtain the original activation password.

3. The remote activation method of the non-activated network monitoring apparatus as claimed in claim 1, wherein receiving the public key sent by the client terminal and generated via the first algorithm comprises:
   receiving a public key matched with a MAC address of the non-activated network monitoring apparatus, sent by the client terminal and generated via the first algorithm;
   or wherein receiving the activation password sent by the client terminal and encrypted via the second algorithm comprises: receiving an activation password matched with a MAC address of the non-activated network monitoring apparatus, sent by the client terminal and encrypted via the second algorithm.

4. The remote activation method of the non-activated network monitoring apparatus as claimed in claim 1, wherein the second algorithm is an Advanced Encryption Standard (AES) symmetric encryption algorithm.

5. A non-activated network monitoring apparatus, comprising: a hardware processor coupled with a memory and configured to execute program instructions stored on the memory; wherein the program instructions comprise:
   receiving an encrypted activation password sent by a client terminal;
   decrypting the encrypted activation password to obtain an original activation password;
   determining whether the original activation password meets a predetermined password strength requirement;
   activating, when the original activation password meets the predetermined password strength requirement, the non-activated network monitoring apparatus and set the original activation password as an administrator password; and
   returning information indicating that the non-activated network monitoring apparatus is successfully activated to the client terminal,
   wherein no default password is set for the non-activated network monitoring apparatus,
   wherein the program instructions further comprise:
   receiving a public key sent by the client terminal and generated via a first algorithm, and returning an encrypted random string to the client terminal, wherein the encrypted random string is obtained by encrypting, by the encryption and decryption element, an original random string generated by the non-activated network monitoring apparatus via the public key; and receiving an activation password sent by the client terminal and encrypted via a second algorithm, wherein the activation password is generated by encrypting, by the client terminal, the original activation password via the second algorithm, and a key of the second algorithm is the original random string,
   wherein the program instructions further comprise: before receiving the public key sent by the client terminal and generated via the first algorithm, reporting a Media Access Control (MAC) address to the client terminal, wherein the MAC address is used for uniquely identifying an identity of the non-activated network monitoring apparatus;
   or wherein the program instructions further comprise: besides returning the encrypted random string to the client terminal, reporting a MAC address to the client terminal, wherein the MAC address is used for uniquely identifying an identity of the non-activated network monitoring apparatus;

or wherein the program instructions further comprise: receiving an activation password matched with a MAC address of the non-activated network monitoring apparatus, sent by the client terminal and encrypted via the second algorithm;

or wherein the first algorithm is an asymmetric encryption RSA algorithm.

6. The non-activated network monitoring apparatus as claimed in claim 5,
wherein the program instructions further comprise: decrypting the encrypted activation password via the second algorithm to obtain the original activation password.

7. The non-activated network monitoring apparatus as claimed in claim 5, wherein the program instructions further comprise: receiving a public key matched with a MAC address of the non-activated network monitoring apparatus, sent by the client terminal and generated via the first algorithm.

8. The non-activated network monitoring apparatus as claimed in claim 5, wherein the second algorithm is a symmetric encryption Advanced Encryption Standard (AES) algorithm.

9. An encryption method of a non-activated network monitoring apparatus based on a client terminal, comprising:
receiving an original activation password of a non-activated network monitoring apparatus;
encrypting the original activation password;
generating a public key and a private key via a first algorithm, sending the public key to the non-activated network monitoring apparatus, wherein the public key is adopted by the non-activated network monitoring apparatus to encrypt the original random string generated by the non-activated network monitoring apparatus to generate an encrypted random string;
receiving the encrypted random string sent by the non-activated network monitoring apparatus, decrypting the encrypted random string via the private key to obtain the original random string, and setting the original random string as a key of a second algorithm; and
encrypting the original activation password via the second algorithm to obtain an encrypted activation password;
sending the encrypted activation password to the non-activated network monitoring apparatus; and
after the non-activated network monitoring apparatus is activated successfully according to the encrypted activation password, receiving information, indicating that the non-activated network monitoring apparatus is successfully activated, returned from the activated network monitoring apparatus,
wherein no default password is set for the non-activated network monitoring apparatus.

10. The encryption method of the non-activated network monitoring apparatus based on the client terminal as claimed in claim 9, before sending the public key to the non-activated network monitoring apparatus, further comprising:
receiving a Media Access Control (MAC) address sent by the non-activated network monitoring apparatus, wherein the MAC address is used for uniquely identifying an identity of the non-activated network monitoring apparatus;
or wherein while receiving the encrypted random string sent by the non-activated network monitoring apparatus, the encryption method further comprises: receiving a MAC address sent by the non-activated network monitoring apparatus, wherein the MAC address is used for uniquely identifying an identity of the non-activated network monitoring apparatus;

or wherein the first algorithm is a RSA asymmetric encryption algorithm, and the second algorithm is an Advanced Encryption Standard (AES) symmetric encryption algorithm.

11. The encryption method of the non-activated network monitoring apparatus based on the client terminal as claimed in claim 10, wherein sending the public key to the non-activated network monitoring apparatus comprises:
sending a public key matched with a MAC address of the non-activated network monitoring apparatus to the non-activated network monitoring apparatus;
or wherein sending the encrypted activation password to the non-activated network monitoring apparatus comprises:
sending an activation password matched with the MAC address of the non-activated network monitoring apparatus to the non-activated network monitoring apparatus.

12. A client terminal, comprising: a hardware processor coupled with a memory and configured to execute program instructions stored on the memory; wherein the program instructions comprise:
receiving an original activation password of a non-activated network monitoring apparatus;
encrypting the original activation password;
generating a public key and a private key via a first algorithm, and sending the public key to the non-activated network monitoring apparatus via the interface, wherein the public key is adopted by the non-activated network monitoring apparatus to encrypt the original random string generated by the non-activated network monitoring apparatus to generate an encrypted random string;
receiving the encrypted random string sent by the non-activated network monitoring apparatus, decrypting the encrypted random string via the private key to obtain the original random string, and setting the obtained original random string as a key of a second algorithm; and
encrypting the original activation password via the second algorithm to obtain an encrypted activation password;
sending the encrypted activation password to the non-activated network monitoring apparatus, and receiving, after the non-activated network monitoring apparatus is activated successfully according to the encrypted activation password, information, indicating that the non-activated network monitoring apparatus is successfully activated, returned from the activated network monitoring apparatus,
wherein no default password is set for the non-activated network monitoring apparatus.

13. The client terminal as claimed in claim 12, wherein the program instructions comprise: before sending the public key to the non-activated network monitoring apparatus, receiving a Media Access Control (MAC) address sent by the non-activated network monitoring apparatus, wherein the MAC address is used for uniquely identifying an identity of the non-activated network monitoring apparatus;
or wherein the program instructions comprise: receiving a MAC address sent by the non-activated network monitoring apparatus, wherein the MAC address is used for uniquely identifying an identity of the non-activated network monitoring apparatus;

or wherein the first algorithm is a RSA asymmetric encryption algorithm, and the second algorithm is an Advanced Encryption Standard (AES) symmetric encryption algorithm.

14. The client terminal as claimed in claim 13, wherein the program instructions comprise: sending a public key matched with a MAC address of the non-activated network monitoring apparatus to the non-activated network monitoring apparatus;

or wherein the program instructions comprise: sending an activation password matched with a MAC address of the non-activated network monitoring apparatus to the non-activated network monitoring apparatus.

15. A remote activation system based on a non-activated network monitoring apparatus, comprising a client terminal, arranged to receive an original activation password of a non-activated network monitoring apparatus, and encrypt the original activation password; and the non-activated network monitoring apparatus, arranged to receive an encrypted activation password from the client terminal, decrypt the encrypted activation password to obtain the original activation password, determine whether the original activation password meets a predetermined password strength requirement, activate, when the original activation password meets the predetermined password strength requirement, the non-activated network monitoring apparatus, set the original activation password as an administrator password, and the activated network monitoring apparatus return information indicating that the non-activated network monitoring apparatus is successfully activated to the client terminal;

the client terminal, further arranged to send, after receiving the information indicating that the non-activated network monitoring apparatus is successfully activated, a prompt indicating that the non-activated network monitoring apparatus is successfully activated, wherein no default password is set for the non-activated network monitoring apparatus.

16. The remote activation system based on the non-activated network monitoring apparatus as claimed in claim 15, wherein the client terminal is arranged to receive the original activation password of a non-activated network monitoring apparatus and encrypt the original activation password comprises the following step:

sending a public key generated via a first algorithm to the non-activated network monitoring apparatus, wherein the public key is adopted by the non-activated network monitoring apparatus to encrypt the original random string generated by the non-activated network monitoring apparatus to generate an encrypted random string; and decrypting the encrypted random string returned by the non-activated network monitoring apparatus by using a private key generated via the first algorithm to obtain the original random string, setting the original random string as a key of a second algorithm, encrypting the original activation password via the second algorithm to obtain an encrypted activation password, and sending the encrypted activation password to the non-activated network monitoring apparatus.

* * * * *